US006557585B2

(12) United States Patent
Kwak

(10) Patent No.: US 6,557,585 B2
(45) Date of Patent: May 6, 2003

(54) SAFETY WATER-SUPPLY VALVE APPARATUS FOR WATER PURIFIER

(75) Inventor: Jung Bum Kwak, Seongnam (KR)

(73) Assignee: Jein Industries Co., Ltd., Kyounggi-do (KR)

( * ) Notice: Subject to any disclaimer, the term of this patent is extended or adjusted under 35 U.S.C. 154(b) by 0 days.

(21) Appl. No.: 10/046,860

(22) Filed: Jan. 14, 2002

(65) Prior Publication Data

US 2003/0015242 A1 Jan. 23, 2003

(30) Foreign Application Priority Data

Jul. 18, 2001 (KR) ........................................... 01-43225

(51) Int. Cl.[7] ................................................. F16K 5/00
(52) U.S. Cl. .................................. 137/613; 137/614.19
(58) Field of Search ............................ 137/613, 614.19

(56) References Cited

U.S. PATENT DOCUMENTS 2,147,084 A * 2/1939 Bouchard .......... 137/614.19 X
4,471,807 A * 9/1984 Lucking et al. ........ 137/614.19

* cited by examiner

*Primary Examiner*—Kevin Lee
(74) *Attorney, Agent, or Firm*—Jenkens & Gilchrist, P.C.

(57) ABSTRACT

In a water-supply valve apparatus comprising a first on-off rod 4 for opening and closing a discharge outlet 22 with an intake lever 6, and a second on-off rod 5 for turning on and off the flow of the water from a supply-tube 1 by pressing a pushing member 7, regardless of the operation of the first on-off rod 4, the first on-off rod 4 comprises a stopper having a T-shaped hole arranged at the position where the first on-off rod 4 is at right angles to the second on-off rod 5, the second on-off rod 5 comprises an elastic hook 210 passing through the horizontal part 110 of the T-shaped hole and being hooked on the vertical part 120 of the T-shaped hole, and an anti-rotation wing 200 for preventing the second on-off rod 5 from rotating. The anti-rotation wing 200 is inserted into an anti-rotation hole 300 formed in a guide hole 71 of the pushing member 7.

6 Claims, 7 Drawing Sheets

SAFETY WATER-SUPPLY VALVE APPARATUS FOR WATER PURIFIER

BACKGROUND OF THE INVENTION (1) Field of the Invention

The present invention relates to a water-supply valve apparatus having a dual blocking structure for a hot and cold water purifier, more particularly to a safety water-supply valve apparatus capable of preventing a user's hand from getting bunt accidentally and water from leaking unnecessarily due to careless handling.

(2) Description of the Related Arts

Recently, a hot and cold water purifier is widely used to serves fresh water, which purifies contaminated water with filters and cools or heats the purified water.

Generally, a hot and cold water purifier includes an intake lever for adjusting the quantity of water according to a user's handling. By handling the intake lever, an on-off rod is open or closed, so that hot water or cold water is discharged from the hot and cold water purifier.

In the conventional water purifier, even if a minute touch is applied to the intake lever, a discharge tube may be opened easily, so that an unnecessary water leakage may occurs. Particularly, a child or the old and the weak may be burnt his hand on the hot water accidentally discharged from the water purifier.

In order to solve this problem, Korean Utility Model Publication No. 0178030 discloses a water-supply lever safety apparatus for a hot and cold water purifier, as illustrated FIGS. 1, 2 and 3. This water-supply lever safety apparatus comprises a first on-off rod 4 and a second on-off rod 5, which are arranged in an on-off part 3 for connecting a supply tube 1 and a discharge tube 2 as a body, and an intake lever 6 and a pushing means 7 for controlling the first on-off rod 4 and the second on-off rod 5.

The supply tube 1 is tubular structure such as a cylinder and includes a connecting means 11 formed as a female screw therein, as shown FIG. 3.

The discharge tube 2 comprises a globular member 21 such as a sphere and a discharge outlet connecting with the globular member 21, shown in FIGS. 1 and 2. The globular member 21 and the discharge outlet are connected to be able to rotate, so that a user can change selectively the discharging direction of hot water or cold water, as shown FIG. 4.

The on-off part 3 is a body for forming a supply valve, and comprises an inlet 31 for connecting with the supply tube 1 in the back side thereof, an outlet 32 for connecting with the discharge outlet 32 in the bottom side thereof, and mounting holes 33, 34 which are bored through the upper side and the front side thereof.

Further, the first on-off rod 4 is a shaft structure such as a stick, a soft sealing member 41 is formed on the bottom side thereof, and a soft sealing case 42 is arranged on the upper side thereof, as shown FIG. 1*a*. In the soft sealing case 42, a spring 43 is wounded on the first on-off rod 4. As shown FIGS. 1 to 3, a hinge hole P is arranged on the upper side of the first on-off rod 4.

Further, the second on-off rod 5 is a shaft structure as a stick, a fixing means 51 having a male screw 511 and a through-hole 512 is coupled in one side thereof, and a spring 52 is wounded on the fixing means 51. The side surface of the spring 52 is abutted on a guide plate 53 having a through-hole 531, and a soft sealing member 54 are formed in succession. Separating from the soft sealing member 54 at a distance, a carrying guide hole 55 of ring shape is arranged on the other side of the second on-off rod 5, as shown FIG. 3.

Further, the intake lever 6 is an ordinary lever structure for rotating by a predetermined range. On the upper side of the intake lever 6, as shown FIG. 2, an operation member 61 of a quadrangular shape is formed as a body.

Further, the pushing means 7, as shown FIGS. 1 to 3, has a open space in one side thereof, and a guide hole 71 having a latch 711 is formed on the inside of the open space. A button cap 72 having a guide jaw is coupled in the front side of the open space, and a mobile member 73 of stick shape is arranged in the guide hole 71.

However, there are several problems in the above safety water-supply lever apparatus as follows:

Firstly, in order to discharge water from the water purifier, a user have to push a lever with one hand holding a cup and to press a button of the water purifier with the other hand. Therefore, continuously requiring two hands for discharging water, it is inconvenient for using.

Secondly, in the case that hot water is discharged for a long time, the heat of the inside is transmitted to the button, so that pushing the button continuously is difficult for the user.

SUMMARY OF THE INVENTION

Accordingly, it is an object the present invention to provide a safety supply-valve apparatus for a hot and cold water purifier, which is able to prevent hot water from discharging accidentally and water from leaking unnecessarily due to careless handling.

To achieve the above-mentioned objective, according to a aspect of the present invention, there is provided a safety supply-valve apparatus comprising a first on-off rod for opening and closing a discharge outlet with a intake lever, and a second on-off rod for turning on and off the flow of water from a supply-tube by a pushing means, regardless of the operation of the first on-off rod 4. The first on-off rod comprises a stopper having a T-shaped hole arranged at the position where the first on-off rod is at right angles to the second on-off rod. The second on-off rod comprises an elastic hook passing through the horizontal part of the T-shaped hole and being hooked on the vertical part of the T-shaped hole; and an anti-rotation wing for preventing the second on-off rod from rotating. The anti-rotation wing is inserted into an anti-rotation hole formed in a guide hole of the pushing means.

Therefore, according to the safety supply-valve apparatus related to the present invention, by pushing a lever with one hand taking a cup and pushing a button with the other hand, even if the pushed button is released, water is discharged continuously as long as the lever is pushed. When the water discharging is completed (that is, when the opening operation of the lever is released), the pushing of the button is released automatically. Accordingly, it is possible to prevent a user's hand from getting bunt accidentally and water from leaking unnecessarily.

DETAILED DESCRIPTION OF THE EMBODIMENTS

Figure 1:
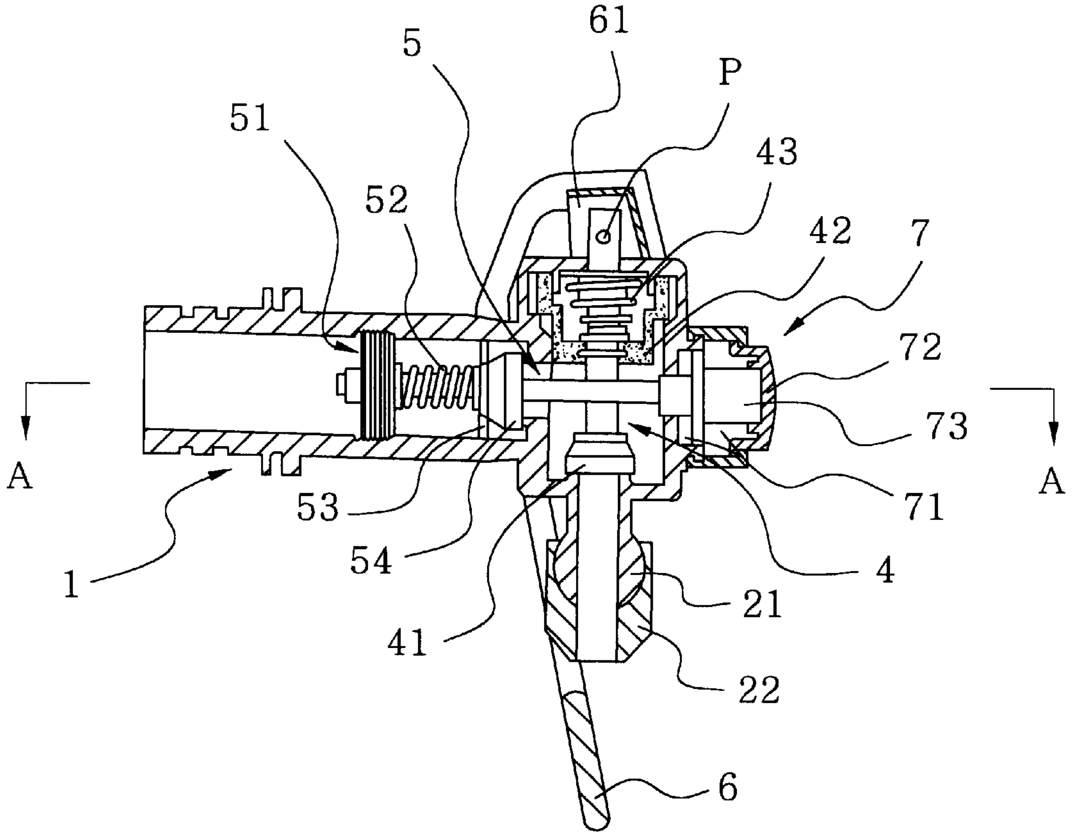
Prior Art Fig. 1
FIG. 1 is a sectional view of a prior art safety supply-valve apparatus for a hot and cold water purifier.
Figure 2:
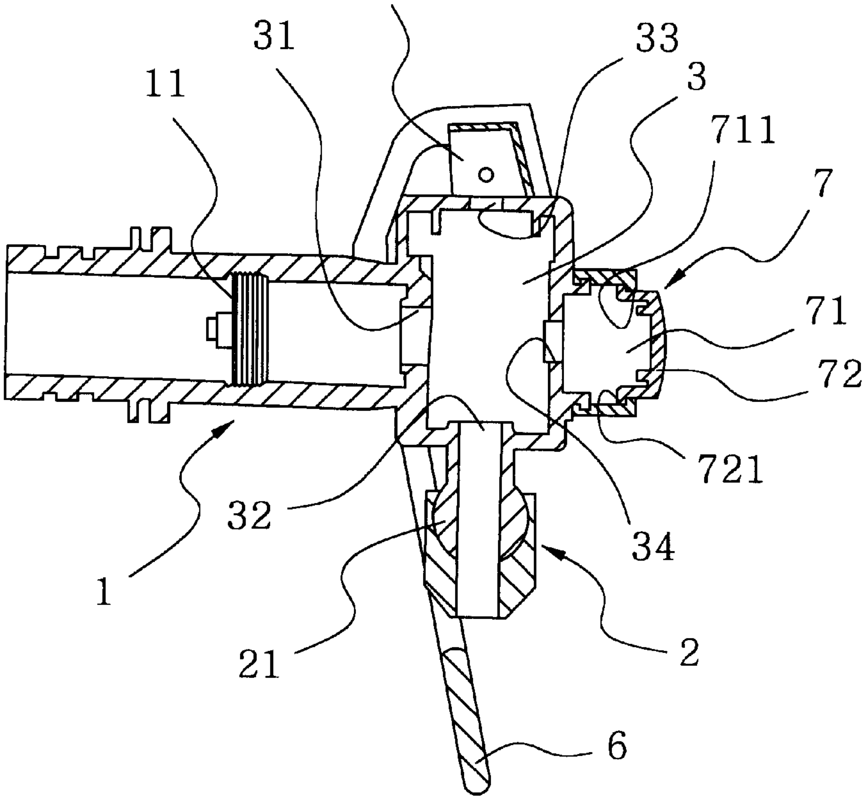
Prior Art Fig. 2
FIG. 2 is a schematic view showing the principal part of the prior safety supply-valve apparatus of FIG. 1.
Figure 3:
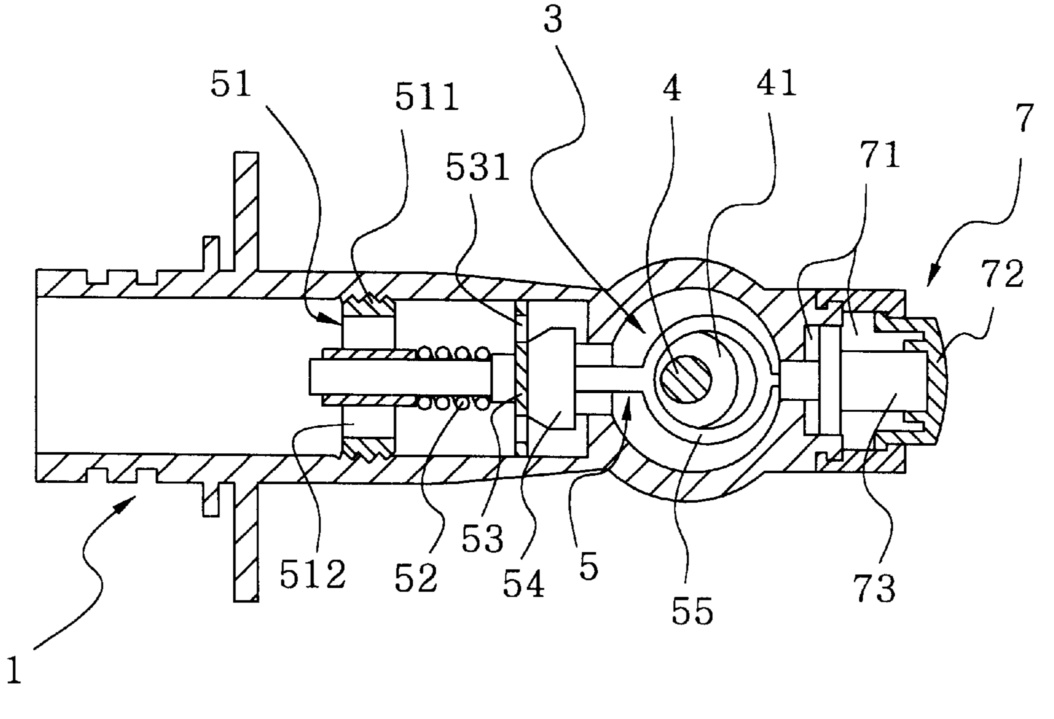
Prior Art Fig. 3
FIG. 3 is a sectional view of the prior art safety supply-valve apparatus taken along line A—A of FIG. 1.

Referring now to attaching the drawings, a safety supply-valve apparatus for a hot and cold water purifier according to an embodiment of the present invention will be described in detail. It is noted that like parts are designated by like reference numerals throughout the accompanying drawings.

Figure 5A:
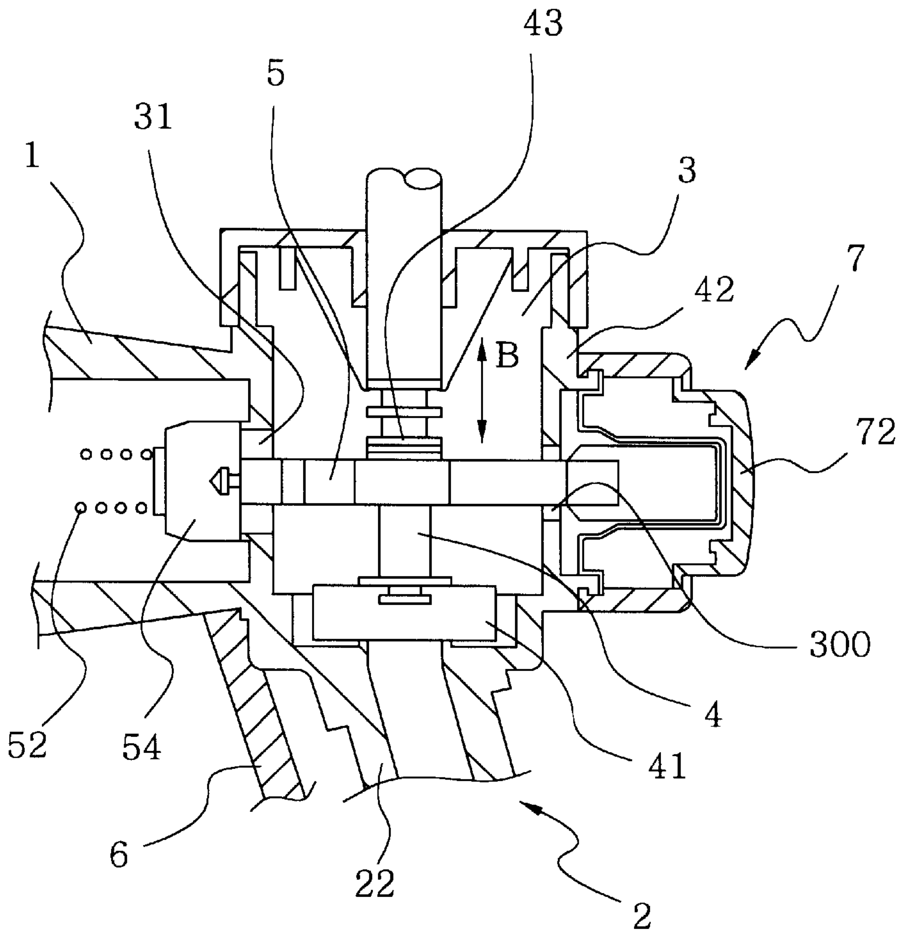
FIG. 5*a* is a longitudinal sectional view showing the principal parts of the safety supply-valve apparatus according to the present invention.
Figure 5B:
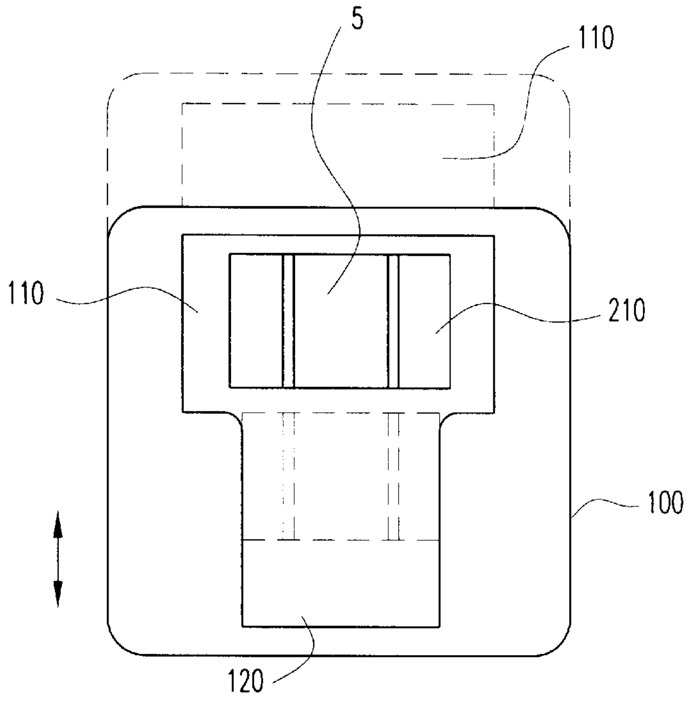
FIG. 5*b* is a schematic view showing a stopper of the safety supply-valve apparatus according to the present invention.
Figure 6:
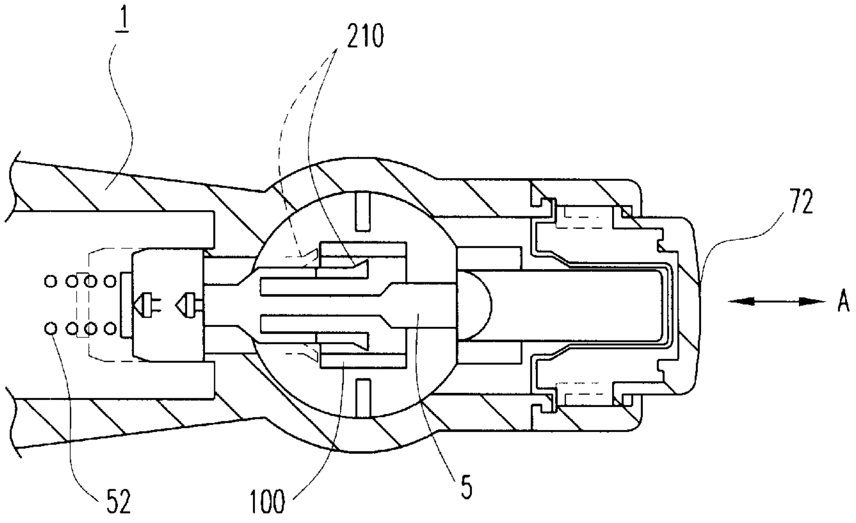
FIG. 6 is cross sectional view showing the principal parts of the safety supply-valve apparatus according to the present invention.

FIGS. 5*a* to 6 show a safety supply-valve apparatus according to the present invention.

Similar to the prior art safety supply-valve apparatus as shown in FIG. 1, the first and the second on-off rod 4, 5 are arranged in an on-off part 3 for connecting a supply tube 1 and a discharge tube 2 as a body. The intake lever and the pushing means 7 control the first and the second on-off rod 4, 5.

Figure 4:
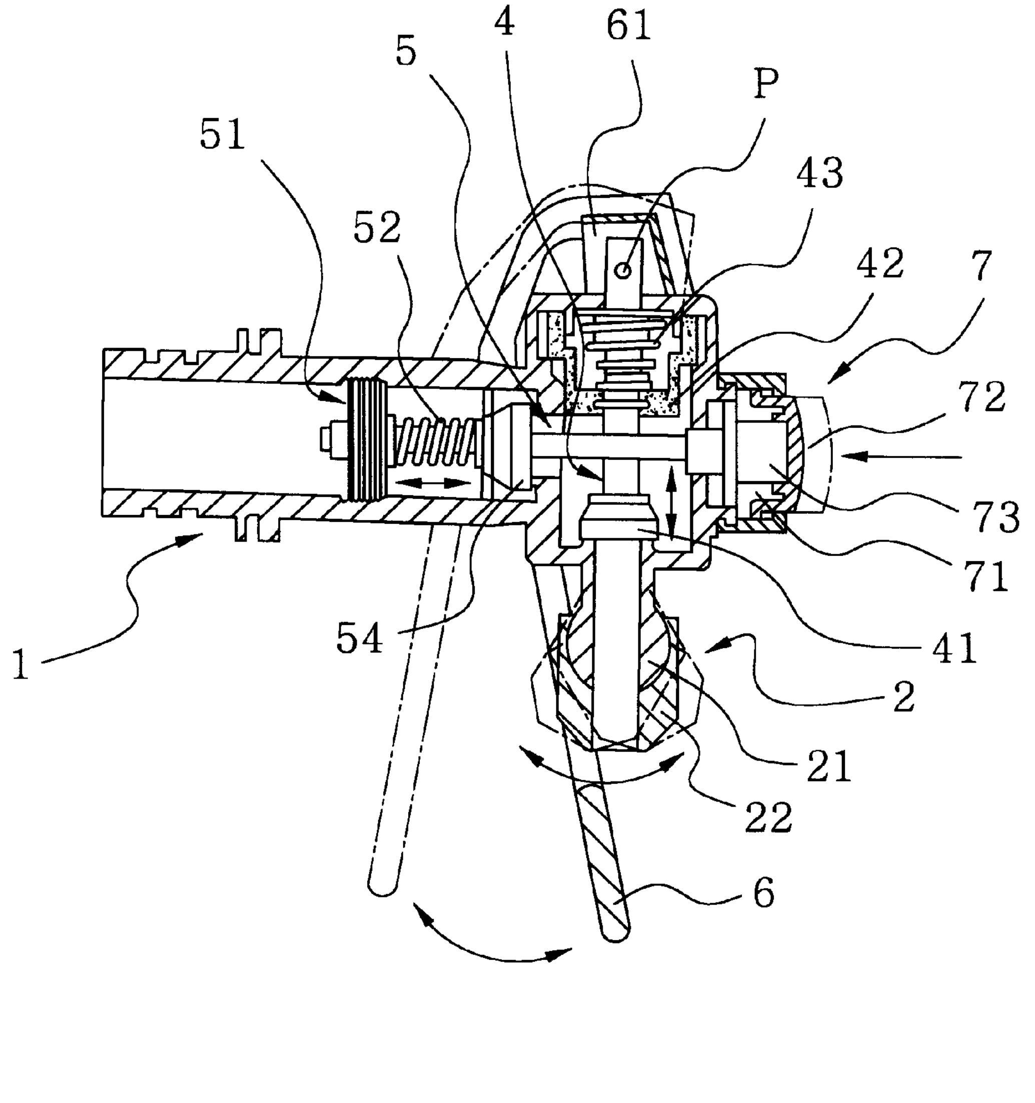
Prior Art Fig. 4
FIG. 4 is a schematic view showing an operating state of the prior art safety supply-valve apparatus of FIG. 1.

As shown in FIG. 4, the safe supply-valve apparatus according to present invention is capable of changing selectively the discharging direction of hot water or cold water as the occasion demands. Further, the on-off part 3 constitutes the body of the supply-valve, forms an inlet 31 connected with the supply tube 1 in the back side thereof, as shown FIG. 5*a,* and forms a discharge outlet 22 connected with the discharge tube 2 in the bottom side thereof.

The stopper 100 having a T-shaped hole, which is arranged at the position where the first on-off rod 4 is at right angles to the second on-off rod 5, as shown FIGS. 5*a* to 5*b,* is formed on the first on-off rod 4 as a body. The stopper 100 is made in the form of a regular quadrilateral on the whole. The T-shaped hole of the stopper 100 has a horizontal part 110 and vertical part 120.

In normal state, the elastic hooks 210 of the second on-off rod 5 are in the horizontal part(hole) of the first on-off rod 4. In operational state, the first on-off rod 4 moves to a longitudinal direction of the first on-off rod and the horizontal part and the vertical part of the first on-off rod 4 also move to a longitudinal direction of the first on-off rod as shown by upper broken line part (imaginary line) in FIG. 5*b*. Thus, the second on-off rod 5 and the elastic hooks 210 (broken line) are inserted into the vertical part of the first on-off rod 4 because the second on-off rod 5 and the elastic hooks 210 are not moved.

Figure 7A:
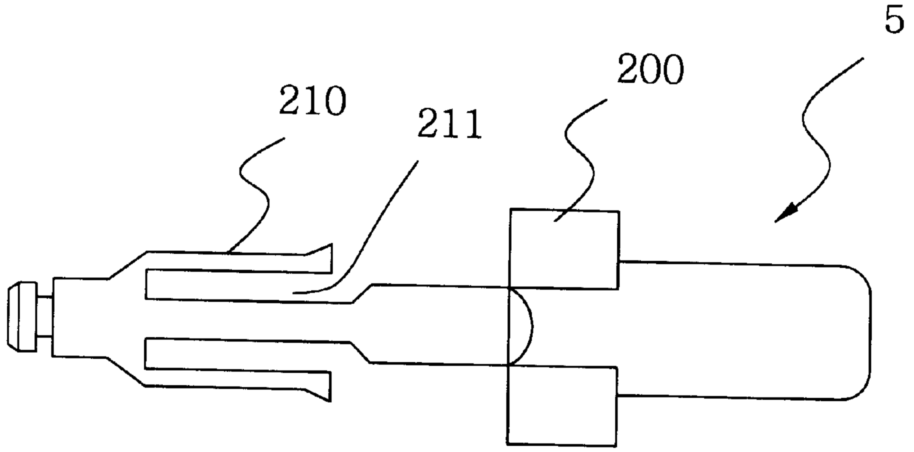
FIG. 7*a* is a top view showing the first on-off rod of the safety supply-valve apparatus according to the present invention.
Figure 7B:
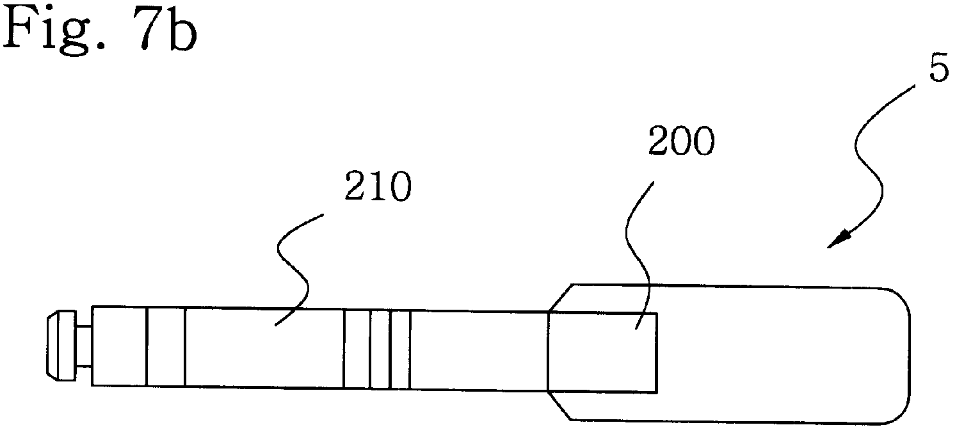
FIG. 7*b* is a front view showing the first on-off rod of the safety supply-valve apparatus according to the present invention.

As shown FIGS. 7*a* to 7*b,* the elastic hook 210 is formed in both sides of the second on-off rod 5, and a movable gap 211 is set to be capable of moving the elastic hook 210 at a distance. Further, the second on-off rod 5 has a cutting plane of 45 degrees so as to prevent interference with the elastic hook 210.

As shown FIG. 6, the anti-rotation wing 200 for preventing the second on-off rod 5 from rotating is formed in the second on-off rod 5 and inserted into the anti-rotation hole 300 formed in the sealing case 42 of the pushing means 7. Further, the boundary surface for crossing the anti-rotation wing 200 and the second on-off rod 5 has an angle of approximately 45 degrees.

Next, referring to FIG. 1, a method for assembling components of the supply-valve apparatus formed as a body is described. By screwing a fixing means 51 on the connecting means 11 of the supply tube 1, the sealing member 54 blocks off the inlet 31. A carrying guide hole 55 is arranged eccentrically on the center of the on-off part 3 and connected to a mobile member 73 as a body, which is arranged in the a guide hole 71 through the mounting hole 34. Therefore, the second on-off rod 5, the on-off part 3 and the pushing means 7 are coupled and arranged at a horizontal structure.

Accordingly, in above described safety supply-valve apparatus for a hot and cold purifier, if the intake lever 6 is pressed by external force, as shown FIG. 5*a,* an operation member 61 applies the tensile force to the first on-off rod 4 connected by a hinge joint, so that the first on-off rod 4 compresses a spring 43 to ascend to the direction of the arrow A and opens the discharge outlet 22.

At this state, since the second on-off rod 5 blocks off the supply tube 1, even if the intake lever 6 opens the discharge outlet 22, the hot water is not supplied.

Successively, as shown FIG. 6, if the button cap 72 is pressed to the direction of the arrow B, the second on-off rod 5 moves forward and the anti-rotation wing 200, which is formed in the second on-off rod 5 as a body, moves to the virtual line of the FIG. 6. At the same time, the elastic hook 210 passes through the horizontal part 110 and is hooked on the vertical part 120, so that the elastic hook 210 is stopped temporarily. At this time, the sealing member 41 is opened, so that hot water is discharged.

On the other hand, if the intake lever 6 is released, the first on-off rod 4 is descended by the elastic force of the spring, so that the elastic hook 210 hooked on the vertical part 120 is moved in the horizontal part 120, as shown FIG. 5*b*. Then, the supply tube 1 is closed and the discharge outlet 22 is closed too.

Therefore, by a series of the actions as above described, users gets safely hot water in a cup.

In the above mentioned safety supply-valve apparatus, by pushing a lever with one hand taking a cup and pushing a button with the other hand, even if the button is released, water is discharged continuously as long as the lever is pushed. When the water discharging is completed, the pushing of the button is released automatically. Accordingly, it is possible to prevent a user's hand from getting burnt accidentally and water from leaking unnecessarily.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A safety supply-valve apparatus having a first on-off rod for opening and closing a discharge outlet with a intake lever, a second on-off rod for turning on and off the flow of water from a supply-tube by a pushing means regardless of the operation of the first on-off rod, a soft sealing member for blocking and permitting the flow of water in non-operational state and operational state of the apparatus, respectively; a fixing means positioned in the supply-tube having an opening therein for the flow of water and a spring disposed between the sealing member and the fixing means said apparatus comprising:

a stopper formed in the first on-off rod;

a plurality of elastic hooks formed in the second on-off rod, said hooks having one end integrated with the rod and the other end separated from the rod with a distance;

an anti-rotation wing formed in the second on-off rod, said anti-rotation wing preventing the second on-off rod from rotating;

an anti-rotation hole formed in a guide hole of the pushing means, said anti-rotation wing being inserted into said anti-rotation hole;

a T-shaped hole formed in the stopper, said T-shaped hole having a horizontal part and a vertical part extending from the horizontal part; and wherein the first on-off rod and the second on-off rod cross each other at right angles in order for the second on-off rod to pass through the horizontal part of the T-shaped hole in non-operational state of the apparatus.

2. An apparatus as in claim 1, wherein when the intake lever is pressed by an external force and then the first on-off rod is moved, the horizontal part hole and the vertical part hole in the stopper is also moved in a direction away from and approaching the second on-off rod and the elastic hooks respectively, thus the second on-off rod and the elastic hooks are inserted into the vertical part of the stopper.

3. An apparatus as in claim 2, wherein when the second on-off rod and the elastic hooks are inserted into the vertical part and the elastic hooks are bent to the second on-off rod and the distance is decreased.

4. An apparatus as in claim 3, wherein as the hooks are being inserted into the vertical part and the pushing means are pressed by an external force and the second on-off rod moves against a force imparted by the spring, the hooks come out of the vertical part and return to original position due to the hooks' elastic force, and the end apart from the second on-off rod is hooked on a side of the stopper, said side being at a right angle to the vertical part and faced to the sealing member.

5. An apparatus as in claim 4, wherein when the end apart from the second on-off rod is hooked on the side, the sealing member is opened and water flows as long as the intake lever is pressed regardless of the force imparted by the spring.

6. An apparatus as in claim 2, wherein when the external force exerted on the intake lever is released, the hooks hooked on the side of the stopper move to the horizontal part hole and are released, thus the hooks are moved toward the pushing means by the force imparted by the spring and the sealing member is thereby closed to block the flow of water.

* * * * *

UNITED STATES PATENT AND TRADEMARK OFFICE

CERTIFICATE OF CORRECTION

PATENT NO. : 6,557,585 B2
DATED : May 6, 2003
INVENTOR(S) : Jung Bum Kwak

It is certified that error appears in the above-identified patent and that said Letters Patent is hereby corrected as shown below:

<u>Title page</u>,
Item [57], ABSTRACT,
Line 5, replace "pushing member 7," with -- pushing means 7, --
Line 15, replace "pushing member 7." with -- pushing means 7. --
Line 16, please add: -- Therefore, the safety water-supply valve apparatus is able to prevent a user's hand from getting burnt accidentally and water from leaking unnecessarily due to careless handling. --

<u>Column 3</u>,
Line 29, please add: -- The safety supply-valve apparatus comprises a first on-off rod 4 for opening and closing a discharge outlet 22 with an intake lever 6, and a second on-off rod 5 for turning on and off the flow of the water from a supply-tube 1 by pressing a button cap 72, regardless of the operation of the first on-off rod 4. --

Signed and Sealed this

Thirtieth Day of December, 2003

JAMES E. ROGAN
*Director of the United States Patent and Trademark Office*